United States Patent [19]

Hasegawa et al.

[11] Patent Number: 4,713,266
[45] Date of Patent: Dec. 15, 1987

[54] METHOD FOR PRODUCTION OF POLYESTER STRUCTURES WITH IMPROVED GAS BARRIER PROPERTY

[75] Inventors: Kenji Hasegawa, Hirakata; Tetsuo Sato, Kyoto; Teruo Iwanami, Ibaraki, all of Japan

[73] Assignee: Nippon Gohsei Kagaku Kogyo Kabushiki Kaisha, Osaka, Japan

[21] Appl. No.: 16,698
[22] PCT Filed: Apr. 18, 1986
[86] PCT No.: PCT/JP86/00199
§ 371 Date: Dec. 12, 1986
§ 102(e) Date: Dec. 12, 1986
[87] PCT Pub. No.: WO86/06392
PCT Pub. Date: Nov. 6, 1986

[30] Foreign Application Priority Data

Apr. 19, 1985 [JP] Japan .................................. 60-84726

[51] Int. Cl.⁴ ............................................. B05D 3/02
[52] U.S. Cl. .............................. 427/412.5; 427/393.5; 427/407.1; 428/35
[58] Field of Search .............. 427/412.5, 407.1, 393.5; 428/35

[56] References Cited

U.S. PATENT DOCUMENTS

T 103,002  5/1983  Petke ................ 427/412.5 X
3,326,742  6/1967  Shepherd ............ 427/412.5
4,564,541  1/1986  Taira et al. ........... 428/35
4,576,918  3/1986  Hilger et al. ........ 427/412.5 X

FOREIGN PATENT DOCUMENTS 0118226  9/1984  European Pat. Off. .
7011567  12/1970  Netherlands .......... 427/412.5 X
1314827  4/1973  United Kingdom ...... 427/412.5 X Primary Examiner—Thurman K. Page
Attorney, Agent, or Firm—Armstrong, Nikaido, Marmelstein & Kubovcik

[57] ABSTRACT

In coating a polyester substrate structure with a solution of a vinyl alcohol resin having a high gas barrier property, the surface of the polyester substrate structure is precoated with a solvent solution of a polyester having the following formulation and an intrinsic viscosity of at least 0.4 and dried to provide an anchor coating layer on said surface.

| Acid component: | |
|---|---|
| Terephthalic acid and/or isophthalic acid | 90 to 40 mol % |
| An aliphatic dicarboxylic acid containing 2 to 12 carbon atoms | 10 to 60 mol % |
| Diol component: | |
| A straight-chain or cyclic diol containing 2 to 8 carbon atoms | 90 to 10 mol % |
| A branched diol containing 3 to 6 carbon atoms | 10 to 90 mol % |

The above procedure provides a polyester structure with excellent gas barrier property.

8 Claims, No Drawings

METHOD FOR PRODUCTION OF POLYESTER STRUCTURES WITH IMPROVED GAS BARRIER PROPERTY

TECHNICAL FIELD

The present invention relates to a method of producing a polyester structure with improved gas barrier property which comprises coating a polyester substrate structure with a solution of a vinyl alcohol resin having a high gas barrier property.

BACKGROUND ART

(Prior Art)

Polyesters such as polyethylene terephthalate are excellent in moldability and biaxially-stretchable and give structures which excel in clarity, mechanical strength, heat resistance and impact resistance and are moderately good in gas barrier property. Therefore, such structures have found broad application as containers for foods such as carbonated beverages. However, being moderately good, the gas barrier property of polyester structures is not as good as desired, so that foods in polyester containers cannot keep long. Improvements, therefore, have been awaited.

For the purpose of improving the gas barrier property of polyester articles, attempts have been made to provide a multi-layer structure consisting of at least one polyester layer and at least one gas-impermeable ethylene-vinyl alcohol copolymer layer by utilizing the multi-layer extrusion, extrusion coating, or other technique but as the mutual adhesive affinity of the polyester and ethylene-vinyl alcohol copolymer is low, improvements in this interlayer adhesive bond strength are desired.

For the purpose of improving the above-mentioned interlayer bond strength, there has recently been proposed a method in which a defined thermoplastic polyester, i.e. a polyester consisting of terephthalic acid and isophthalic acid in the proportions of 95 to 40 mol percent and 5 to 60 mol percent, respectively, based on the total dibasic acid component, is interposed as an adhesive layer between the above-mentioned two heterogenous layers and the two layers are intimately welded together in the molten state of the adhesive (Japanese Patent Application Kokai 59-143637) or a method in which a thermoplastic polyester comprising terephthalic acid in a proportion of at least 40 mol percent of the total dibasic acid component and containing ether bonds in a proportion of 17 millimols per 100 grams of the resin within its backbone chain (Japanese Patent Application Kokai 59-143638) is interposed as an adhesive layer between said two heterogenous layers and the two layers are then intimately welded together in the molten state of the adhesive.

(Problems that the Invention to Solve)

However, when the lamination of said polyester layer, adhesive layer and ethylene-vinyl alcohol copolymer layer is carried out in molten state by multi-layer extruction, extrusion coating, multi injection molding or the like technique in accordance with the prior art described in the above-mentioned Japanese Patent Application Kokai 59-143637 or 59-143638, the thicknesses of the adhesive layer and the ethylene-vinyl alcohol copolymer layer are unnecessarily thicker so that the product structure suffers a substantial loss of clarity in comparison with the single layer polyester structure. Furthermore, the application of a lamination process involving a molten state of the materials, such as multi-layer extrusion, extrusion coating or multi injection molding is disadvantageous, from the standpoint of commercial scale production, in that a large capital investment is required for the production equipment, the molding conditions are difficult to set, and the manufacture of laminates with intricate shapes is difficult.

(Objects of the Invention)

An object of the present invention is to provide a method of producing polyester structures with excellent gas barrier property which comprises coating a polyester substrate structure with a solution of a vinyl alcohol resin having a high gas barrier performance instead of relying on a lamination process involving a molten state of the materials.

Another object of the present invention is to provide a method of forming a dry anchor coating layer on the surface of a polyester substrate structure from a solvent solution of a defined polyester prior to coating of the polyester substrate structure with a solution of a vinyl alcohol resin having an improved gas barrier performance to give a polyester structure with excellent gas barrier property.

DISCLOSURE OF THE INVENTION

The above-mentioned problems can be solved by providing the method of producing a polyester structure with improved gas barrier property according to the present invention comprising coating a polyester substrate structure with a solution of a vinyl alcohol resin having a high gas barrier performance, characterized in that the surface of the polyester substrate structure is precoated with a solvent solution of a polyester having the following formulation and an intrinsic viscosity of at least 0.4 and dried to provide an anchor coating layer on said surface.

| Acid component: | |
|---|---|
| Terephthalic acid and/or isophthalic acid | 90 to 40 mol % |
| An aliphatic dicarboxylic acid containing 2 to 12 carbon atoms | 10 to 60 mol % |
| Diol component: | |
| A straight-chain or cyclic diol containing 2 to 8 carbon atoms | 90 to 10 mol % |
| A branched diol containing 3 to 6 carbon atoms | 10 to 90 mol % |

The present invention will be described in detail below.

As examples of the polyester substrate structure used in the working of the present invention, there may be mentioned shaped articles of polyethylene terephthalate, polybutylene terephthalate, polycarbonate or the like as molded by blow molding, injection molding, extrusion or the like technique. These articles may have been stretched or otherwise oriented either simultaneously with molding or thereafter. They may also be multi-layer laminates having one or two plyester surface layers. These articles may be in optional configurations, such as bottles, cups, trays, boxes, tubes, cylinders, sheets, films and so on, although bottles are particularly important.

As examples of the vinyl alcohol resin having a high gas barrier performance, there may be mentioned polyvinyl alcohol, modified polyvinyl alcohol, hydrolyzed ethylene-propylene-vinyl acetate copolymer, hydrolyzed long-chain α-olefin-vinyl acetate copolymer, and so on.

Of the above-mentioned resins, hydrolyzed ethylene-vinyl acetate copolymer (i.e. ethylene-vinyl alcohol copolymer) having an ethylene content of 20 to 55 mol percent, preferably 25 to 50 mol percent, a degree of hydrolysis of vinyl acetate component in a range not less than 90 mol percent, preferably not less than 95 mol percent, and an intrinsic viscosity in a range of 0.7 to 1.5 dl/g is especially desirable in terms of water resistance, mechanical strength and other properties. If the ethylene content is less than 20 mol percent, the gas barrier property of the product is too low in a high humidity environment. If the ethylene content exceeds 55 mol percent, the gas barrier property is inadequate. If the degree of hydrolysis of the vinyl acetate component is less than 90 mol percent, the gas barrier property is inadequate. Further, if the intrinsic viscosity is below 0.7 dl/g, the mechanical strength is poor. The vinyl alcohol resin with an intrinsic viscosity of more than 1.5 dl/g presents production difficulties and is not practically useful. It should be understood that the term 'intrinsic viscosity' as used herein means the intrinsic viscosity measured in a 15:85 mixture of water and phenol at a temperature of 30° C.

The vinyl alcohol resin with a high gas barrier performance is coated in the form of a solution over the surface of a polyester substrate structure on which an anchor coating layer to be described hereinafter has been previously formed. As the solvent for dissolving the resin, a virtually any desired organic or inorganic solvent capable of dissolving vinyl alcohol resins can be used either singly or as a mixture.

For example, when the vinyl alcohol resin is an ethylene-vinyl alcohol copolymer, the solvent may advantageously be a mixture of water and alcohol, such as water-isopropyl alcohol, water-n-propanol, water-n-butanol, water-sec-butanol, water-isobutyl alcohol, etc. The practically desirable weight ratio of water to alcohol is 20:80 to 80:20. These water-alcohol solvent mixtures may be supplemented with formic acid, phenol, dimethylformamide, N-methylpyrrolidone and/or other solvents. Particularly preferred is a mixture of water, alcohol and formic acid with a water-alcohol weight ratio of 20:80 to 80:20 and a weight ratio of water and alcohol combined to formic acid in a range of 98:2 to 60:40. When a solution of said ethylene-vinyl alcohol copolymer in such a solvent mixture of water, alcohol and formic acid is coated on the anchor layer, the most desirable effects are obtained in terms of clarity, oxygen inpermeability, and adhesive bond strength.

If the concentration of vinyl alcohol resin in the solution is too low, the layer formed therefrom is too thin to provide a sufficient improvement in gas barrier property, while an excessively high concentration of the resin results in poor workability and sacrifices the clarity of the polyester structure on account of an excessive thickness. Therefore, the concentration of vinyl alcohol resin is preferably selected from the range of 1 to 20 weight percent. The coating thickness is preferably in the range of 2 to 20μ when dry. If the thickness is less than 2μ, pinholes may be easily formed to frustrate the object of improving the gas barrier property. If the coating thickness exceeds 20 μ, the high clarity of the polyester product may be adversely affected. The especially preferred range is 3 to 15μ.

Regarding the coating procedure, one may utilize dipping, spray coating, brush coating and other techniques when the polyester structure is three-dimensional, and roll coating, curtain flow coating, etc. as well as the above-mentioned coating techniques when the structure is two-dimensional.

In coating the polyester substrate structure with a solution of said vinyl alcohol resin having a high gas barrier performance, it is essential to provide an anchor layer on the surface of the polyester substrate structure beforehand by coating the latter with a solvent solution of the following polyester and drying the coating.

The polyester used for this purpose is a polyester having the under-mentioned formulation and an intrinsic viscosity of at least 0.4.

| Acid component: | |
|---|---|
| Terephthalic acid and/or isophthalic acid | 90 to 40 mol % |
| An aliphatic dicarboxylic acid containing 2 to 12 carbon atoms | 10 to 60 mol % |
| Diol component: | |
| A straight-chain or cyclic diol containing 2 to 8 carbon atoms | 90 to 10 mol % |
| A branched diol containing 3 to 6 carbon atoms | 10 to 90 mol % |

As examples of the aliphatic dicarboxylic acid mentioned just above, there may be mentioned oxalic acid, malonic acid, succinic acid, adipic acid, sebacic acid, pimelic acid, azelaic acid, dimethylmalonic acid, diglycolic acid, thiodipropionic acid, malonic acid, glutaric acid, dodecanedicarboxylic acid, pimelic acid, 2,2-dimethylglutaric acid and so on.

As examples of said straight-chain or cyclic diol containing 2 to 8 carbon atoms, there may be mentioned ethylene glycol, 1,3-propylene glycol, diethylene glycol, triethylene glycol, dipropylene glycol, bisphenol dioxypropyl ether, 1,4-butanediol, 1,6-hexanediol, 1,4-cyclohexanedimethanol, cyclohexanediol and so on.

As examples of said branched diol containing 3 to 6 carbon atoms, there may be mentioned 1,2-propylene glycol, neopentyl glycol, 1,3-butanediol, 2,3-butanediol, and so on.

The proportion of terephthalic acid and/or isophthalic acid in the acid component is 90 to 40 mol % and preferably 80 to 50 mol %. If the proportion exceeds 90 mol %, the solubility in organic solvents decreases. If the proportion is less than 40 mol %, the molecular cohesive force is poor and, hence, the adhesive affinity for the polyester substrate is inadequate.

The proportion of said aliphatic dicarboxylic acid containing 2 to 12 carbon atoms in the acid component is 10 to 60 mol % and preferably 20 to 50 mol %. If the proportion is less than 10 mol %, the solubility in organic solvents is low. If, conversely, the proportion exceeds 60 mol %, the molecular cohesive force is low and, hence, the adhesive affinity for the polyester substrate is inadequate.

Then, the proportion of said straight-chain or cyclic diol containing 2 to 8 carbon atoms in the diol component is 90 to 10 mol % and preferably 85 to 15 mol %. If the proportion exceeds 90 mol %, the solubility in organic solvents decreases. If, conversely, the proportion is less than 10 mol %, the adhesive strength to the polyester substrate is low and the intrinsic viscosity is not sufficiently high.

The proportion of said branched diol containing 3 to 6 carbon atoms in the diol component is 10 to 90 mol % and preferably 15 to 85 mol %. If the proportion is less than 10 mol %, the solubility in organic solvents is low. If, conversely, the proportion exceeds 90 mol % the adhesive affinity for the polyester substrate deteriorates and the intrinsic viscosity is also not sufficiently high.

The polyester prepared by the condensation reaction of said acid and diol components must have an intrinsic viscosity of at least 0.4 dl/g. If the intrinsic viscosity is less than 0.4 dl/g, the cohesive force is low, the adhesive affinity for the polyester substrate is inadequate, and particularly the initial bond strength is not sufficiently high. It should be understood that the term 'intrinsic viscosity' as used here means the value measured in a 1:1 (w/w) mixture of phenol and 1,1,2,2-tetrachloroethane at a temperature of 30° C.

The above-mentioned condensation reaction can be conducted by reacting said acid component with said diol component in an inert gaseous atmosphere at a temperature of about 150° to 260° C.

The polyester thus prepared is dissolved in an organic solvent and submitted as such to the formation of said anchor layer on the polyester substrate. In this stage, a polyisocyanate is preferably added in a proportion of up to 30 weight parts, preferably 0.1 to 25 weight parts, to each 100 weight parts of the polyester. As examples of said polyisocyanate, there may be mentioned tolylene diisocyanate, diphenylmethane-4,4'-diisocyanate, hexamethylene diisocyanate, xylylene diisocyanate, isophorone diisocyanate, 1,4-tetramethylene diisocyanate, etc., and adducts thereof to trimethylolpropane, triethylene glycol, etc.

The organic solvent mentioned above may be selected from among the common organic solvents such as cellosolve acetate, butyl cellosolve acetate, methyl ethyl ketone, methyl isobutyl ketone, cyclohexanone, benzene, toluene, xylene, ethyl acetate and so on.

The solution of vinyl alcohol resin is coated on this anchor layer. The solvent used at this stage, e.g. water and alcohol, is capable of reacting with the polyisocyanate but, nonetheless, this polyisocyanate was surprisingly found to contribute to adhesive bond strength.

The polyester anchor layer can be coated on the polyester substrate by the same techniques as those mentioned for coating with the vinyl alcohol resin. A coating thickness of about 0.1 to 3$\mu$ when dry is sufficient and the concentration of the polyester solution is controlled so as to yield a film of the above thickness. After coating, the anchor layer is allowed to dry spontaneously or dried by heating.

Following the formation of such anchor layer, the above-mentioned vinyl alcohol resin is coated, followed by drying. This procedure gives the objective polyester structure with excellent gas barrier property.

(Function)

In the polyester structure produced in accordance with the present invention, the vinyl alcohol resin layer discharges the function of imparting an improved gas barrier property to the polyester structure while the anchor layer contributes to the adhesive bond strength between the polyester substrate structure and the vinyl alcohol resin layer.

(Effects of the Invention)

As the method of the present invention employs a solution coating technique instead of the conventional lamination technique involving a molten stage for the attainment of improved gas barrier property of the polyester substrate, the vinyl alcohol resin layer can attain a sufficient uniformity even with a low thickness so that the excellent clarity of the polyester structure is rarely impaired. Moreover, as a special anchor layer is provided, the adhesive strength between the solution-coated vinyl alcohol resin layer and the polyester substrate is excellent.

When a mixed organic solvent solution of polyester and polyisocyanate is used as an anchor coating composition over the polyester substrate, the polyisocyanate surprisingly contributes to an improved bond strength notwithstanding the fact that the vinyl alcohol resin solution applied on top of the anchor coating layer so formed contains water and alcohol which are liable to react with the polyisocyanate.

When an ethylene-vinyl alcohol copolymer is used as the vinyl alcohol resin and a solution of this copolymer in a mixture of water, alcohol and formic acid is coated on the anchor coating layer formed as above in accordance with the present invention, there are obtained the most satisfactory effects in terms of clarity, oxygen impermeability and adhesive strength.

BEST MODE FOR CARRYING OUT THE INVENTION

The present invention will be described in further detail by way of examples. It should be understood that the various determinations and tests described in the working and comparative examples were conducted under the following conditions.

For the evaluation of clarity, the haze value was measured in accordance with JIS K6714.

For the evaluation of adhesive strength, the 180° peel strength value was determined using a tensile tester.

For the evaluation of oxygen permeability, the permeation coefficient value was determined at a temperature of 20° C., an internal bottle humidity of 100% R.H., and an external bottle humidity of 65% R.H.

For the evaluation of blister formation, a solution of 5 vol % $CO_2$ was filled into a sample bottle and after the bottle was allowed to remain in an atmosphere at 20° C. and 65% R.H. for 2 weeks, the formation of blisters (cohesive failure) was estimated.

EXAMPLE 1

A four-necked flask equipped with a thermometer, stirrer and packed column was charged with 0.35 mol of terephthalic acid, 0.35 mol of isophthalic acid, 0.30 mol of adipic acid, 0.60 mol of ethylene glycol, 0.40 mol of neopentyl glycol, 0.40 mol of diethylene glycol and 0.1% (based on the total system) of dibutyltin oxide in a nitrogen atmosphere and the esterification reaction was conducted at 140° to 240° C. Then, 0.1% (based on the total system) of antimony trioxide was added and the condensation reaction was carried out in a vaccum of 1 Torr at 220° to 260° C. to give a polyester having an intrinsic viscosity of 0.78 dl/g. This polyester was dissolved in toluene to prepare a polyester anchor coating composition of 10% concentration.

Separately, a hydrolyzed ethylene-vinyl acetate copolymer (ethylene-vinyl alcohol copolymer) with an ethylene content of 30 mol %, a degree of hydrolysis of vinyl acetate component of 99.3 mol %, and an intrinsic viscosity of 1.2 dl/g was dissolved in a 50:45:5 (by weight) mixture of water, isopropyl alcohol and formic acid to give a solution of 8% concentration.

A stretch-blow molded polyethylene terephthalate bottle with a capacity of 1500 cc and a barrel thickness of 700μ was dipped in the above-prepared polyester anchor coating solution at a temperature of 25° C. and dried at 60° C. to provide an anchor coating layer with a thickness of 1μ.

Then, this polyethlene terephthalate bottle produced an anchor coating layer was dipped in the above-prepared ethylene-vinyl alcohol copolymer solution at a temperature of 30° C. and dried at 65° C. to provide a coating layer with a thickness of 7μ.

The clarity, oxygen permeability and adhesive bond strength data and the result of blister evaluation of the above treated bottle are shown in Table 1.

COMPARATIVE EXAMPLE 1

The clarity and oxygen permeability of the stretch-blow molded polyethylene terephthalate bottle submitted to coating in Example 1 were measured. The results are also shown in Table 1.

COMPARATIVE EXAMPLE 2

A stretch-blow molded polyethylene terephthalate bottle similar to that used in Example 1 was coated directly with the ethylene-vinyl alcohol copolymer solution in the same manner as Example 1 except that no anchor coating layer was provided. The results are also shown in Table 1.

EXAMPLE 2

The procedure of Example 1 was repeated except that a 50:50 (by weight) mixture of water and isopropyl alcohol was used as the solvent for said ethylene-vinyl alcohol copolymer in the formation of a coating layer. The results are also shown in Table 1.

TABLE 1

|  | Example 1 | Comparative Example 1 | Comparative Example 2 | Example 2 |
|---|---|---|---|---|
| Haze (%) | 1.3 | 1.0 | 1.2 | 1.2 |
| Oxygen permeability (cc/24 hr) | 0.084 | 0.275 | 0.088 | 0.086 |
| Adhesive strenqth (g/inch) | 1050 | — | 45 | 1010 |
| Blister | Not blistered | — | Blistered | Not blistered |

EXAMPLE 3

In the same manner as Example 1, there was prepared a polyester consisting of 0.16 mol of terephthalic acid, 0.56 mol of isophthalic acid, 0.28 mol of sebacic acid, 0.4 mol of ethylene glycol, and 0.6 mol of neopentyl glycol and having an intrinsic viscosity of 0.70 dl/g. This polyester was dissolved in a 80:20 (by weight) mixture of toluene and methyl ethyl ketone to prepare a solution of 10% concentration. To this solution was added 2% of a 75% solution of tolylene diisocyanate-trimethylolpropane adduct (Coronate L, manufactured by Nippon Polyurethane Industries) to give a polyester anchor coating composition.

Separately, a hydrolyzed ethylene-vinyl acetate copolymer (ethylene-vinyl alcohol copolymer) with an ethylene content of 40 mol %, a degree of hydrolysis of vinyl acetate component of 99.0 mol % and an intrinsic viscosity of 0.85 dl/g was dissolved in a 40:55:5 (by weight) mixture of water, n-propanol and formic acid to prepare a solution of 6% concentration.

A stretch-blow molded polyethylene terephthalate bottle with a capacity of 500 cc and a barrel thickness of 400μ was dipped in the above-prepared polyester anchor coating solution at a temperature of 20° C. and dried at 65° C. to provide an anchor coating layer with a thickness of 2μ.

Then, this polyethylene terephthalate bottle produced an anchor coating layer was dipped in the above-prepared ethylene-vinyl alcohol copolymer solution at a temperature of 30° C. and dried at 65° C. to provide a coating layer with a thickness of 5μ.

The clarity, oxygen permeability and adhesive strength data and the result of blister evaluation of the product bottle are shown in Table 2.

COMPARATIVE EXAMPLE 3

The clarity and oxygen permeability of the stretch-blow molded polyethylene terephthalate bottle submitted to coating in Example 3 were measured. The results are also shown in Table 2.

COMPARATIVE EXAMPLE 4

The procedure of Example 3 was repeated except that the stretch-blow molded polyethylene terephthalate bottle was directly coated with the ethylene-vinyl alcohol copolymer solution without provision of the anchor coating layer. The results are also shown in Table 2.

EXAMPLE 4

The procedure of Example 3 was repeated except that a 45:55 (by weight) mixture of water and n-propyl alcohol was used as the solvent for said ethylene-vinyl alcohol copolymer. The results are also shown in Table 2.

TABLE 2

|  | Example 3 | Comparative Example 3 | Comparative Example 4 | Example 4 |
|---|---|---|---|---|
| Haze (%) | 1.1 | 0.8 | 0.9 | 1.0 |
| Oxygen permeability (cc/24 hr) | 0.092 | 0.153 | 0.095 | 0.094 |
| Adhesive strength (g/inch) | 890 | — | 35 | 800 |
| Blister | Not blistered | — | Blistered | Not blistered |

INDUSTRIAL APPLICABILITY

The polyester structures coated with a vinyl alcohol resin by the method of the present invention are useful in such applications as containers for carbonated beverages, containers for various other foods (inclusive of drinks, seasonings and luxury items), pharmaceutical containers, aerosol containers, and so on.

We claim:

1. A method of producing a polyester structure with improved gas barrier property comprising coating a polyester substrate structure with a solution of a vinyl alcohol resin having a high gas barrier property, characterized in that the surface of the polyester substrate structure is precoated with a solvent solution of a polyester having the following formulation and an intrinsic viscosity of at least 0.4 and dried to provide an anchor coating layer on said surface:

| Acid component: | |
|---|---|
| Terephthalic acid and/or isophthalic acid | 90 to 40 mol % |
| An aliphatic dicarboxylic acid containing 2 to 12 carbon atoms | 10 to 60 mol % |
| Diol component: | |
| A straight-chain or cyclic diol containing 2 to 8 carbon atoms | 90 to 10 mol % |
| A branched diol containing 3 to 6 carbon atoms | 10 to 90 mol % |

2. The method according to claim 1 wherein said vinyl alcohol resin having a high gas barrier performance is an ethylene-vinyl alcohol copolymer with an ethylene content of 20 to 55 mol %, a degree of hydrolysis of vinyl acetate component of at least 90 mol %, and an intrinsic viscosity in a range of 0.7 to 1.5 dl/g and said solution thereof is a solution in a mixed solvent based on water and alcohol.

3. The method according to claim 2 wherein the water-to-alcohol weight ratio of said mixed solvent is in a range of 20:80 to 80:20.

4. The method according to claim 1 wherein said vinyl alcohol resin having a high gas barrier property is an ethylene-vinyl alcohol copolymer with an ethylene content of 20 to 55 mol %, a degree of hydrolysis of vinyl acetate component of at least 90 mol %, and an intrinsic viscosity in a range of 0.7 to 1.5 dl/g and said solution thereof is a solution in a mixed solvent of water, alcohol and formic acid.

5. The method according to claim 4 wherein the water-to-alcohol weight ratio of said mixed solvent is in a range of 20:80 to 80:20 and the weight ratio of water and alcohol combined to formic acid is in a range of 98:2 to 60:40.

6. The method according to claim 1 wherein the coating thickness of said solution of vinyl alcohol resin having a high gas barrier property is 2 to 20$\mu$ when dry.

7. The method according to claim 1 wherein the thickness of said anchor coating layer is 0.1 to 3$\mu$ when dry.

8. The method according to claim 1 which is characterized in that a solvent solution further containing 0.1 to 25 weight parts of a polyisocyanate to each 100 weight parts of the polyester having an intrinsic viscosity of at least 0.4 is used as said polyester solvent solution.

* * * * *